D. B. HART & W. P. WEBSTER.
Wagon-Tongue Support.

No. 203,339.　　　　　　Patented May 7, 1878.

WITNESSES:
C. Sedgwick
J. M. Henley

INVENTOR:
D. B. Hart
W. P. Webster
BY
Munn & Co
ATTORNEYS.

UNITED STATES PATENT OFFICE.

DANIEL B. HART AND WILLIAM P. WEBSTER, OF WEST MENTOR, OHIO.

IMPROVEMENT IN WAGON-TONGUE SUPPORTS.

Specification forming part of Letters Patent No. 203,339, dated May 7, 1878; application filed March 16, 1878.

*To all whom it may concern:*

Figure 1:
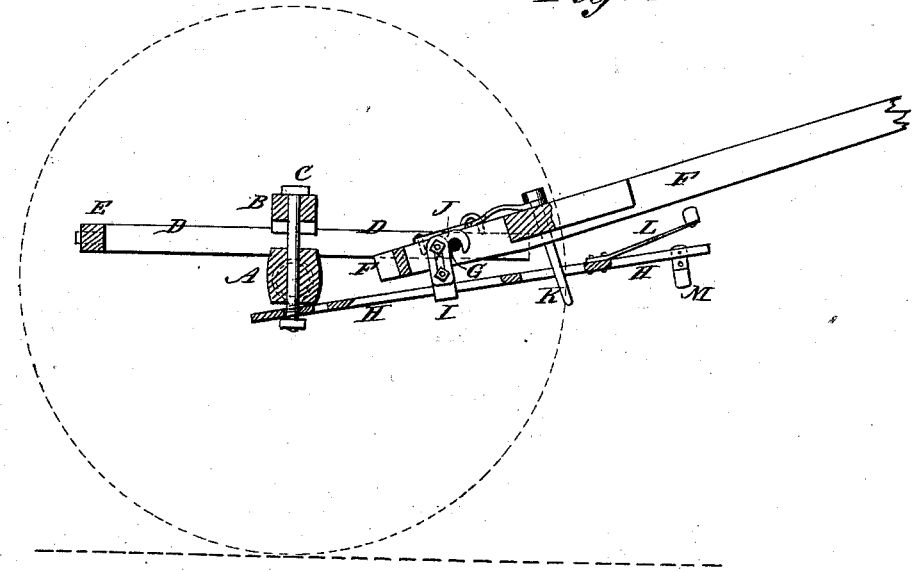
Figure 2:
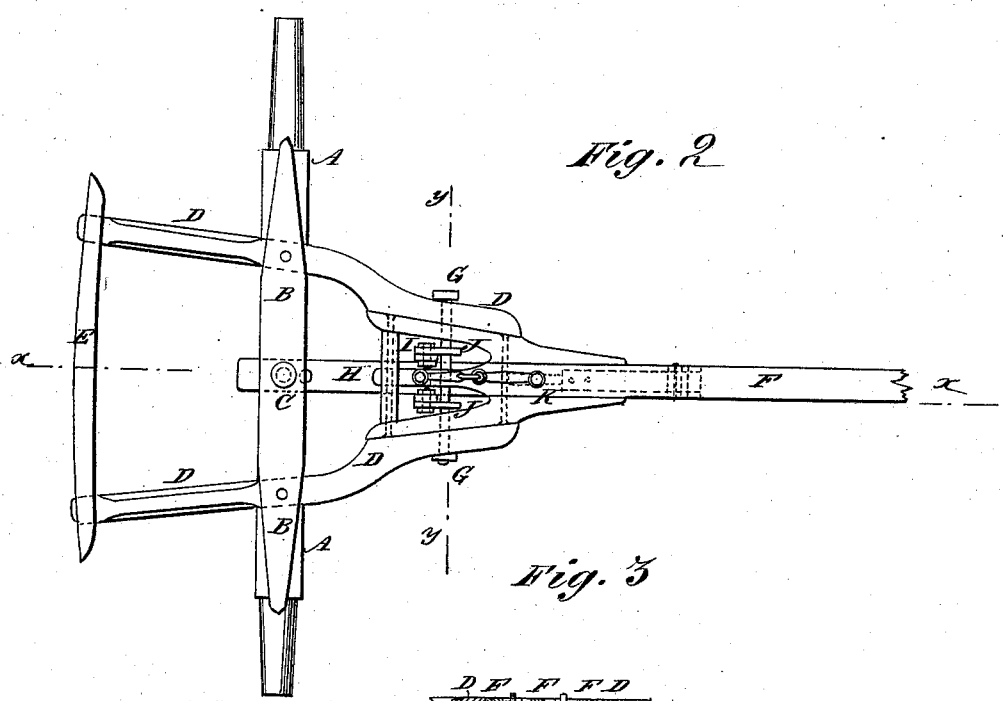
Figure 3:
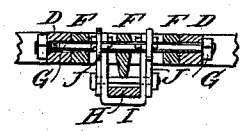

Be it known that we, DANIEL B. HART and WILLIAM P. WEBSTER, of West Mentor, in the county of Lake and State of Ohio, have invented a new and Improved Wagon-Tongue Supporter, of which the following is a specification:

In the accompanying drawings, forming part hereof, Figure 1 is a vertical longitudinal section of the forward part of the running-gear of a wagon to which our improved tongue-supporter has been applied, taken through the line $x\ x$, Fig. 2. Fig. 2 is a top view of the same. Fig. 3 is a detail cross-section of the same, taken through the line $y\ y$, Fig. 2.

Similar letters of reference indicate corresponding parts.

The object of this invention is to furnish an improved device for supporting a wagon-tongue to relieve the horses' necks from having to support its weight, and which shall be simple in construction, conveniently applied, easily adjusted, and effective in use.

The invention consists in the combination of the bar and the adjustable stirrup with the axle, the king-bolt, the tongue, the hooks, and the bolt that hinges the said tongue to the hounds.

A represents the forward axle; B, the head-block; C, the king-bolt; D, the forward hounds; E, the sway-bar; F, the tongue; and G the bolt that hinges the tongue F to the hounds D, about the construction of which parts there is nothing new.

H is a bar, the rear end of which has a hole formed through it to receive the king-bolt C. The bar H passes through the loop of the U-bar I, to the arms of which are bolted the shanks of the hooks J.

The shanks of the hooks J and the arms of the U-bar I are slotted to receive the bolts by which they are secured to each other, so that they may be readily adjusted as may be required, and so that by loosening the said bolts the said hooks may be passed over and removed from the tongue-bolt G. The U-bar I and the hooks J thus form a stirrup to receive and support the bar H.

The forward part of the bar H is slotted to allow the double-tree bolt K to pass through. To the forward part of the bar H is attached the end of the spring L, upon the forward end of which, or upon a block attached to the said forward end, rests the tongue F.

M is a block, which has a tenon formed upon it to pass through a mortise in the forward end of the bar H, where it is secured in place by a bolt.

Several holes are formed in the tenon of the block M to receive the fastening-bolt, so that the said block may be adjusted as may be required. The block M is designed for the tongue F to rest upon, and may be used in connection with the spring L, or instead of the said spring, as may be required.

Several holes are formed in the rear end of the bar H to receive the king-bolt C, so that the bar H may be adjusted to support the tongue F higher or lower, as may be required.

Having thus described our invention, we claim as new and desire to secure by Letters Patent—

The combination, in wagon-tongue supporters, with the tongue F and bar H, of the loop or U-bar I, having slotted arms, the hooks having slotted shanks, and the tongue-bolt G, as shown and described, so that by loosening the attaching-bolts the hooks may be removed from the tongue-bolt, as set forth.

DANIEL B. HART.
WILLIAM P. WEBSTER.

Witnesses:
T. G. HART,
ALDIE L. HART.